US012607852B2

(12) United States Patent
Macken et al.

(10) Patent No.: US 12,607,852 B2
(45) Date of Patent: Apr. 21, 2026

(54) OPTICAL SYSTEM

(71) Applicant: Snap Inc., Santa Monica, CA (US)

(72) Inventors: Ian Thomas Macken, Rochester (GB); Rory Thomas Alexander Mills, Rochester (GB)

(73) Assignee: Snap Inc., Santa Monica, CA (US)

( * ) Notice: Subject to any disclaimer, the term of this patent is extended or adjusted under 35 U.S.C. 154(b) by 673 days.

(21) Appl. No.: 17/913,696

(22) PCT Filed: Mar. 8, 2021

(86) PCT No.: PCT/GB2021/050572
§ 371 (c)(1),
(2) Date: Sep. 22, 2022

(87) PCT Pub. No.: WO2021/191584
PCT Pub. Date: Sep. 30, 2021

(65) Prior Publication Data
US 2023/0111272 A1 Apr. 13, 2023

(30) Foreign Application Priority Data

Mar. 24, 2020 (EP) ..................................... 20275063
Mar. 24, 2020 (GB) ..................................... 2004220

(51) Int. Cl.
*G02B 27/01* (2006.01)
*G02B 3/00* (2006.01)
(52) U.S. Cl.
CPC ....... *G02B 27/0172* (2013.01); *G02B 3/0081* (2013.01); *G02B 2027/013* (2013.01); *G02B 2027/0174* (2013.01)

(58) Field of Classification Search
CPC .......... G02B 27/0172; G02B 2027/013; G02B 2027/0174; G02B 27/00; G02B 27/0103;
(Continued)

(56) References Cited

U.S. PATENT DOCUMENTS

| | | | |
|---|---|---|---|
| 2013/0314793 A1 | 11/2013 | Robbins et al. | |
| 2016/0041390 A1* | 2/2016 | Poon .................... | G02B 5/3083 |
| | | | 359/489.08 |

(Continued)

FOREIGN PATENT DOCUMENTS

| | | | |
|---|---|---|---|
| CN | 108490756 A | 9/2018 | |
| CN | 110488490 A * | 11/2019 | ......... G02B 27/0101 |

(Continued)

OTHER PUBLICATIONS

"European Application Serial No. 20275063.4, Extended European Search Report mailed Sep. 18, 2020", 8 pgs.
(Continued)

*Primary Examiner* — Jia X Pan
(74) *Attorney, Agent, or Firm* — Schwegman Lundberg & Woessner, P.A.

(57) ABSTRACT
In various embodiments, an optical system to present an image to an eye of a user is disclosed. The system comprises a waveguide configured to output collimated light towards an optically powered element comprising at least one holographic component to generate optical power. The optically powered element is configured to receive the output collimated light from the waveguide and direct the received light towards the eye of the user and impart an angular offset on the directed light such that the directed light forms a virtual image plane.

16 Claims, 6 Drawing Sheets

(58) Field of Classification Search

CPC ..................... G02B 2027/0107; G02B 3/0081;
G02B 5/32; G03H 2225/52; G03H
2240/11; G03H 2240/13

USPC ............................ 359/1, 10, 11, 13, 15, 630

See application file for complete search history.

(56) References Cited

U.S. PATENT DOCUMENTS

| | | | |
|---|---|---|---|
| 2018/0149790 | A1 | 5/2018 | Kim et al. |
| 2018/0239147 | A1* | 8/2018 | Schowengerdt ...... G02B 6/0055 |
| 2018/0292654 | A1 | 10/2018 | Wall et al. |
| 2019/0064526 | A1 | 2/2019 | Connor |
| 2019/0187465 | A1 | 6/2019 | Erler et al. |
| 2020/0064641 | A1* | 2/2020 | Lam ................... G02B 26/0825 |

FOREIGN PATENT DOCUMENTS

| | | | |
|---|---|---|---|
| EP | 2818910 | A1 | 12/2014 |
| EP | 3091740 | A1 | 11/2016 |
| EP | 3885799 | A1 | 9/2021 |
| KR | 20180062946 | A | 6/2018 |
| KR | 20190116447 | A | 10/2019 |
| KR | 20190116448 | A | 10/2019 |
| KR | 102849359 | B1 | 8/2025 |
| WO | WO-2013083049 | A1 | 6/2013 |
| WO | WO-2014091201 | A1 | 6/2014 |
| WO | WO-2016022732 | A1 | 2/2016 |
| WO | WO-2016118367 | A1 | 7/2016 |
| WO | WO-2017096241 | A1 | 6/2017 |
| WO | WO-2021191584 | A1 | 9/2021 |

OTHER PUBLICATIONS

"International Application Serial No. PCT/GB2021/050572, International Search Report mailed Apr. 8, 2021", 4 pgs.

"International Application Serial No. PCT/GB2021/050572, Written Opinion mailed Apr. 8, 2021", 6 pgs.

"Chinese Application Serial No. 202180024058.8, Decision of Rejection mailed May 30, 2024", w/ English Translation, 16 pgs.

"Chinese Application Serial No. 202180024058.8, Office Action mailed Jan. 31, 2024", w/ English Translation, 24 pgs.

"Chinese Application Serial No. 202180024058.8, Request for Reexamination filed Aug. 29, 2024", w/ current English claims, 9 pgs.

"Chinese Application Serial No. 202180024058.8, Response filed May 6, 2024 to Office Action mailed Jan. 31, 2024", w/ current English claims, 8 pgs.

"Korean Application Serial No. 10-2022-7036533, Notice of Preliminary Rejection mailed Sep. 3, 2024", w/ English Translation, 9 pgs.

"Korean Application Serial No. 10-2022-7036533, Response Filed Dec. 2, 2024 to Notice of Preliminary Rejection mailed Sep. 3, 2024", w/ English Claims, 18 pgs.

"United Kingdom Application Serial No. 2103202.4, Combined Search and Examination Report mailed Aug. 9, 2021", 9 pgs.

"United Kingdom Application Serial No. 2103202.4, Response filed May 26, 2022 to Combined Search and Examination Report mailed Aug. 9, 2021", 9 pgs.

"United Kingdom Application Serial No. 2103202.4, Subsequent Examination Report mailed Feb. 1, 2023", 5 pgs.

"European Application Serial No. 24212373.5, Extended European Search Report mailed Jun. 16, 2025", 7 pgs.

* cited by examiner

600

630

620

610

240

OPTICAL SYSTEM

CLAIM OF PRIORITY

This application is a U.S. national-phase application filed under 35 U.S.C. § 371 from International Application Serial No. PCT/GB2021/050572, filed 8 Mar. 2021, and published as WO 2021/191584 on 30 Sep. 2021, which claims the benefit of priority to GB Application Serial No. 2004220.6, filed on 24 Mar. 2020, and EP application Ser. No. 20/275, 063.4, filed on 24 Mar. 2020, each of which is incorporated herein by reference in its entirety.

BACKGROUND

Look-through displays may be used to overlay images and/or symbology over external scenery. This may be used in a heads up display (HUD), head mounted display (HMD), or any other suitable type of display.

DETAILED DESCRIPTION

Figure 1:
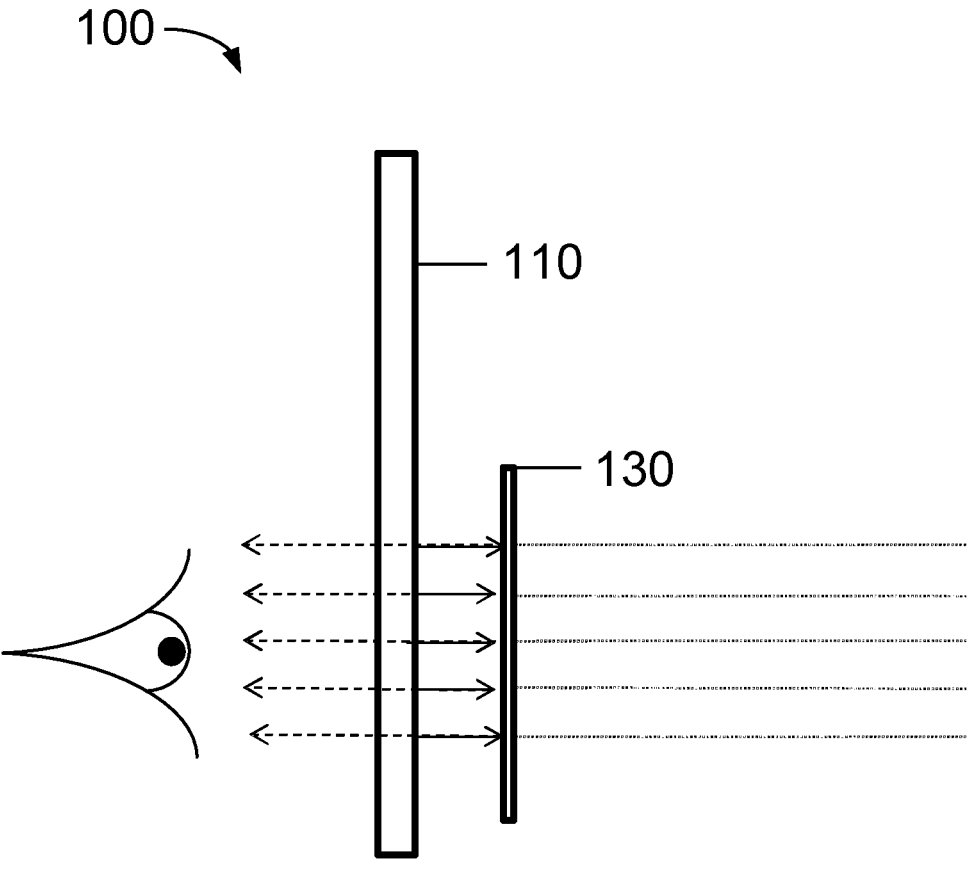
FIG. 1 illustrates a look-through display.

A look-through display 100 is illustrated in FIG. 1. Look-through display 100 comprises a waveguide 110 and a semi-reflective element 130. Collimated light may be input into waveguide 110, and is output towards semi-reflective element 130. Semi-reflective element 130 reflects the collimated light back through the waveguide 110 towards an eye of a user and also allows light to pass from the outside towards the user's eye. The light reflected by the semi-reflective element remains substantially collimated, and so the user perceives the image to be focussed substantially at infinity. In some examples this may reduce the user experience, for example causing discomfort or headaches to the user, especially if the user desires to focus on a real object in their view and also observe the displayed symbology/imagery, that may be associated and/or overlaid with the real object.

Figure 2:
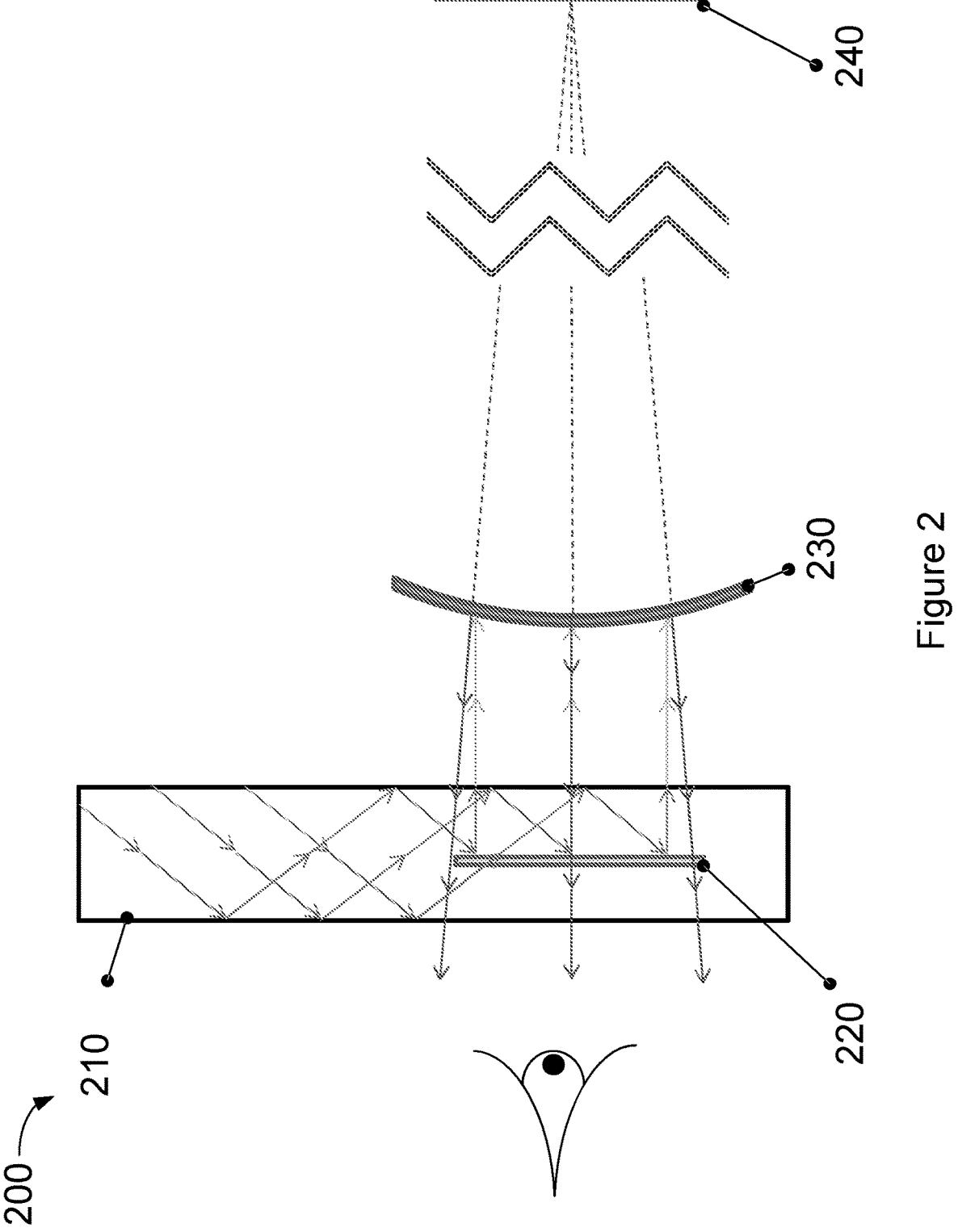
FIG. 2 illustrates an optical system according to some examples.

FIG. 2 illustrates an optical system 200 according to some examples. Optical system comprises an expansion waveguide 210 and an optically powered element 230 comprising holographic components to provide the optical power. Light may be input into expansion waveguide 210, and is expanded in at least one dimension, such that the size of the exit pupil increases in at least one dimension. Output element 220 interacts with the light and causes the light to be output towards optically powered element 230. Light is output collimated, or substantially collimated. Optically powered element 230 adds an angular offset to the collimated light, causing the collimated light to diverge and form a virtual image plane 240. This enables the user to perceive the image displayed by the optical system 200 to be located a certain distance behind the waveguide defined by the virtual image plane 240. This may reduce eye strain and headaches for some users, leading to a better user experience.

In some examples the optical element 230 may be transparent or semi transparent, allowing a user to look through the optically powered element 230 and observe objects beyond the optical element 230. In some examples where the optical element 230 is not transparent, the optical geometry of the optical system may allow the user to still see imagery overlaid with real objects in the user's field of view. These are explained in more detail with reference to FIGS. 4 and 6.

In some example the optically powered element 230 may comprise a thin positive meniscus (convex-concave) shaped element. The convex side facing the user may be coated with a partially reflective coating (beam splitter coating) which would reflect light emitted from the waveguide back towards the user whilst causing the collimated light emitted from the waveguide to diverge forming a virtual image plane 240. The convex side facing away from the user may be shaped in order to minimise any aberrations of the outside world view when viewed through the optically powered element 230.

In some examples the optical system 200 may be configured to compensate for the effect of the optical system on external light passing through the waveguide 210 and/or optically powered element 230 such that the outside scenery is not distorted. In some examples compensation may comprise an adaptation and/or addition to the optically powered element 230. In some examples the compensation may comprise a separate optical element.

In some examples collimated light may be input into waveguide 210. In some examples uncollimated light may be input into the waveguide 210 and the light may be collimated by a component of the waveguide 210.

In some examples there may be an gap, such as an air gap, between the optically powered element 230 and the waveguide. In some examples the optically powered element may be coupled to the waveguide 230.

In some examples the optically powered element 230 may comprise a holographic component which gives the optically powered element 230 optical power. This may allow the optical power to be varied by changing the phase of light input to the optically powered element 330.

In some examples the holographic component may be static, such that it does not vary. In some examples the holographic component may be dynamic, such that it's properties can be varied. In some examples the dynamic holographic component may comprise an addressable and switchable reflective screen, such as liquid crystal display. This may allow the optical power to be varied by changing the phase of light and/or by changing the properties of the holographic component.

Figure 3:
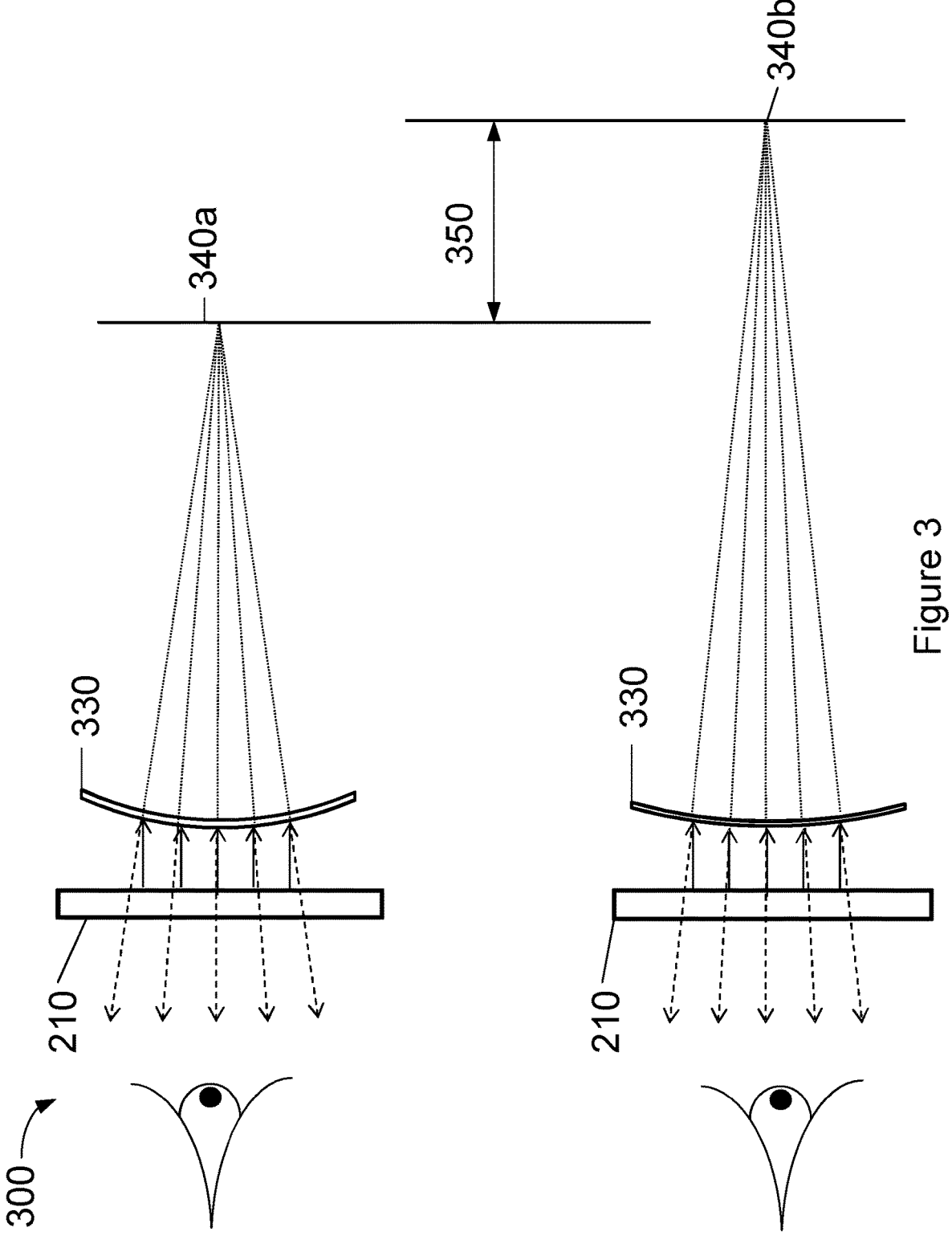
FIG. 3 illustrates an adjustable optical system according to some examples.

FIG. 3 illustrates an adjustable optical system 300 according to some examples. Adjustable optical system 300 may be substantially similar to optical system 200 described in relation to FIG. 2. Adjustable optical system 300 comprises an expansion waveguide 210 and an adjustable optically powered element 330. The expansion waveguide 210 may be substantially similar to the expansion waveguide 210 described in relation to FIG. 2.

Adjustable optical system may be controlled to alter the optical power of the system. In some examples the optically powered element 330 may be controlled to vary the optical power. In some examples the optical power may be varied into at least two states. In a first state the adjustable optically powered element 330 has a first optical power, leading to a virtual image plane 340a at a first distance from the user. In a second state the adjustable optically powered element 330 has a second optical power, different from the first optical power, leading to a virtual image plane 340b at a second distance from the user. The difference in optical power of the first state and second state cause a difference in position 350 of the virtual planes 340a, 340b.

In some examples the adjustable optically powered element 330 may adjust it's optical power based on tracking information of the user's eyes, such as a focus or gaze direction of the eyes.

In some examples the adjustable optically powered element 330 may be continuously adjustable between two points. In some examples the adjustable optically powered element 330 may be discretely variable, such that the adjustable optically powered element 330 may be set to a finite number of optical powers between two points.

In some examples the adjustable optically powered element 330 may be varied in optical power by adjusting the curvature of the adjustable optically powered element 330. Adjusting the curvature may result in the image plane changing, but the focal point may fall on the same axis, i.e. the focal points may all be located on a line that is perpendicular to the output surface of the waveguide.

In some examples the adjustable optically powered element 330 may be varied in optical power by adjusting the shape of the adjustable optically powered element 330. Adjusting the shape may result in the image plane changing, and the focal point may fall on a different axis, i.e. the focal points are not all located on a line that is perpendicular to the output surface of the waveguide.

In some examples the adjustable optically powered element 330 may be varied in optical power between having no optical power (i.e. substantially flat with focus at infinity) and any other focal point.

In some examples the adjustable optically powered element 330 may comprise a microelectromechanical system (MEMS), and/or a piezoelectric device. In some examples the adjustable optically powered element 330 may comprise a electronically active element such as a reflective liquid crystal. In some examples the adjustable optically powered element 330 may comprise a, diffractive, pneumatic, and/or hydraulic device.

In some examples the optically powered element 330 may comprise a holographic lens of fixed optical power. This may allow the lens to be tuned for wavelength, therefore able to maintain high transmission compared to a traditional silver mirror and able to be colour selective. The fixed holographic lens of fixed optical power may additionally or alternatively be tuned for angle. This may allow the lens to be angularly selective i.e. reflect incoming angles from a known field of view but transmit all other light.

The holographic lens of fixed optical power may be substantially flat and/or thin—i.e. formed from a holographic layer between two glass or plastic plates, in comparison to a traditional lens or mirror arrangement where the element is typically curved and/or potentially thick. If the holographic lens is then placed in line with the eye, being a thin and/or flat element mitigates any distortion being imparted on the real world. In some examples where the lens element is placed in line with the waveguide, using a thin/flat holographic lens could also be integrated as a protective cover for the waveguide as well.

In some examples the optically powered element 330 may comprise a holographic lens of variable function, such as variable power or reflectivity. A holographic lens of variable function may offer all the same features as the holographic lens of fixed optical power. The optical power may be varied either through electrical manipulation or physical manipulation of the holographic medium. The reflectivity may be varied to manipulate reflection intensity or the ability to "switch off" the hologram (and hence reflection) entirely. The holographic lens of variable function may be substantially flat and/or thin similar to the holographic lens of fixed optical power.

Holographic lenses may also be stacked together to form various functions. For example you could stack a holographic lenses for green and red light may be stacked, wherein they have different optical powers or reflectivity.

In some example the adjustable optically powered element 330 may comprise a thin positive meniscus (convex-concave) shaped element. The convex side facing the user may be coated with a partially reflective coating (beam splitter coating) which would reflect light emitted from the waveguide back towards the user whilst causing the collimated light emitted from the waveguide to diverge forming a virtual image plane 240. The convex side facing away from the user may be shaped in order to minimise any aberrations of the outside world view when viewed through the adjustable optically powered element 330.

Figure 4:
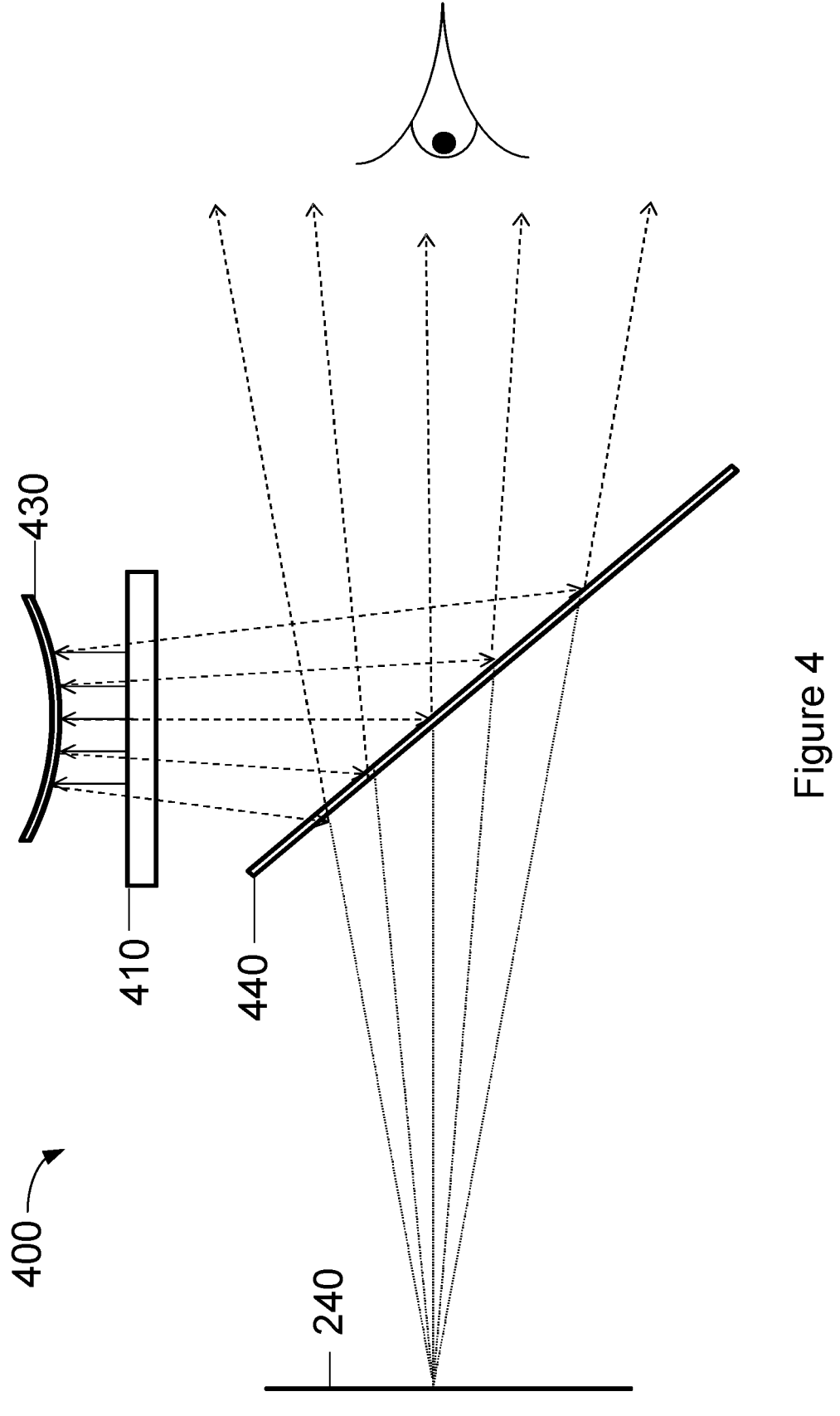
FIG. 4 illustrates a head up display according to some examples.

FIG. 4 illustrates a folded optical system 400 according to some examples. The folded optical system 400 may be substantially similar to the optical system 200 described in relation to FIG. 2 and the adjustable optical system 300 described in relation to FIG. 3. Folded optical system 400 comprises a waveguide 410, an optically powered element 430, and a combiner element 440.

Waveguide 410 receives light, and outputs collimated light towards optically powered element 430. Optically powered element 430 adds an angular offset to the reflected light and reflects it through waveguide 410 to combiner 440.

Combiner 440 is at least semi-transparent such that the user is able to observe outside scenery through combiner 440. The combiner reflects light from the waveguide 410 towards the eye of the user, such that the image plane 240 appears to be behind the combiner 440.

The optically powered element 430 may be opaque, as there is no reason why the optically powered element 430 is required to be looked through. For similar reasons, the optically powered element 440 may also be highly reflective.

Folded optical system 400 may be used in head up displays (HUD) or head down displays, or any other suitable system.

Figure 5:
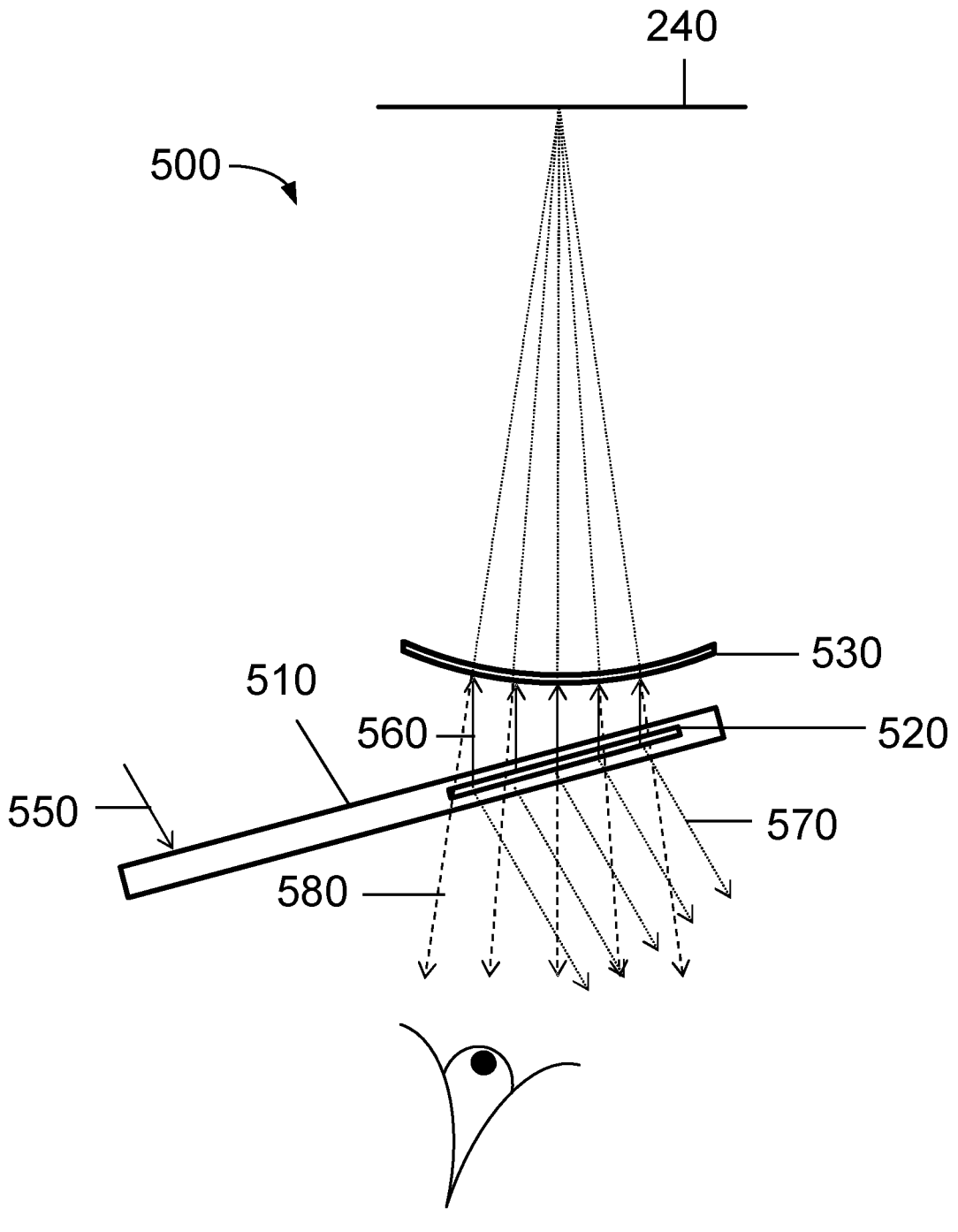
FIG. 5 illustrates an offset optical system according to some examples.

FIG. 5 illustrates an offset optical system 500. Offset optical system 500 may be substantially similar to the optical system 200 described in relation to FIG. 2, the adjustable optical system 300 described in relation to FIG. 3, and the folded optical system 400 described in relation to FIG. 4.

Offset optical system 500 comprises an offset waveguide 510 and an offset optically powered element 530. Offset waveguide receives offset input light 550, which is expanded in at least one dimension and propagates down offset waveguide 510. Due to the presence of element 520 the light is output from the offset waveguide 510. The type of the offset waveguide 510 may lead to light being emitted on both sides of the offset waveguide 510, as illustrated in FIG. 5. User light 560 emitted towards the offset optically powered element 530 is reflected by offset optically powered element 530 and an angular offset added such that the light diverges and forms a virtual image plane 240. The light then passes through the waveguide again such that the user observes the image to be formed at the virtual plane 240. Non-user light 570 is emitted away from the user's eye and away from the offset optically powered element 530 such that it is not received by the user. This reduces the chance of a double image being observed by the user.

The offset optically powered element 530 may be designed, in combination with the offset waveguide 510 to ensure that light received from the offset optically powered element 530 appear to be focused at virtual image plane 240.

In some example the offset optically powered element 530 may comprise a thin positive meniscus (convex-concave) shaped element. The convex side facing the user may be coated with a partially reflective coating (beam splitter coating) which would reflect light emitted from the waveguide back towards the user whilst causing the collimated light emitted from the waveguide to diverge forming a virtual image plane 240. The convex side facing away from the user may be shaped in order to minimise any aberrations of the outside world view when viewed through the offset optically powered element 530.

Figure 6:
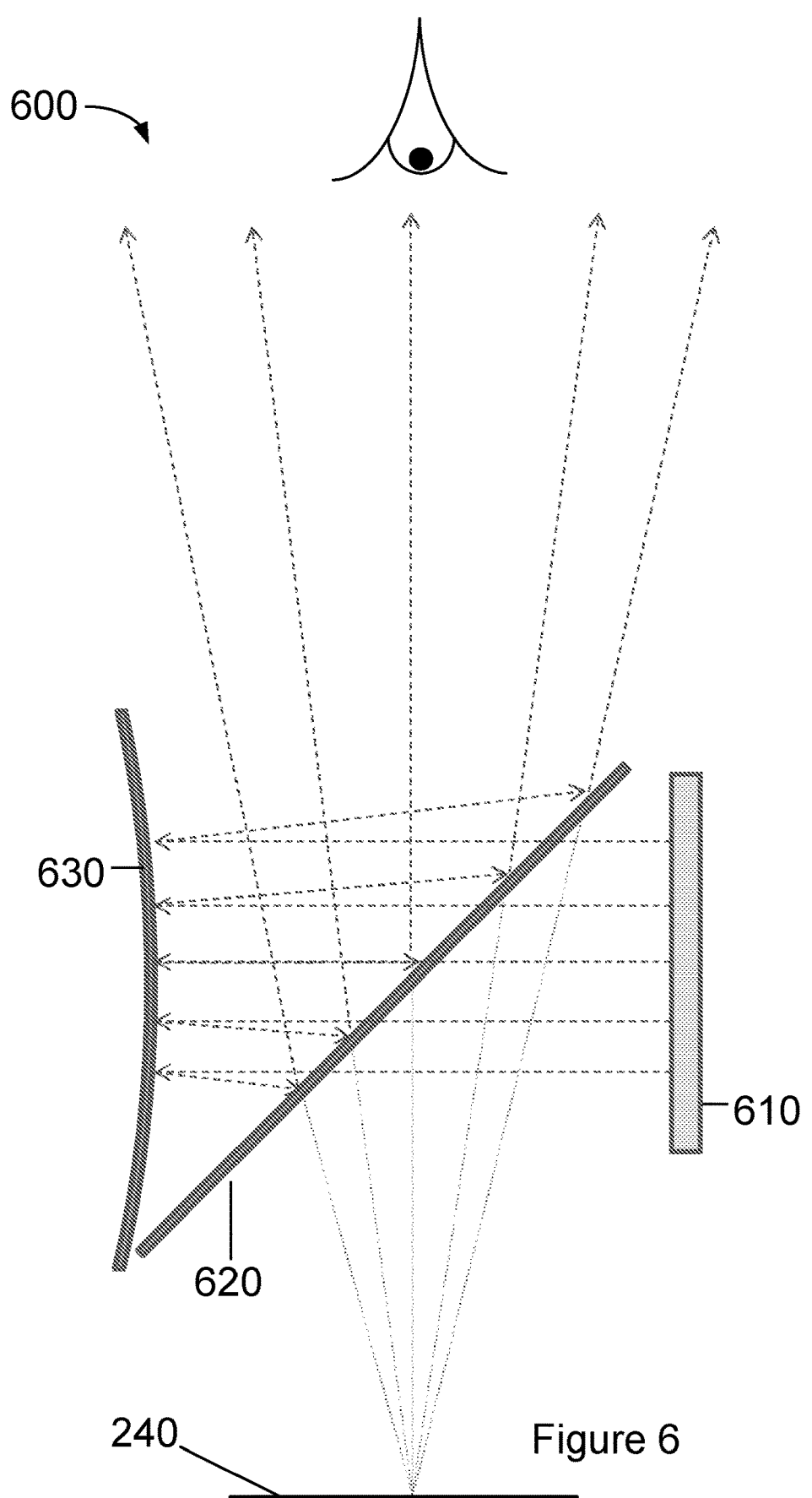
FIG. 6 illustrates a birdbath optical arrangement according to some examples.

FIG. 6 illustrates a birdbath style optical system 600 according to some examples, where the light does not pass back through the waveguide. Birdbath style optical system 600 comprises a birdbath waveguide 610, a semi-reflective mirror 620, and a birdbath optically powered element 630. The birdbath waveguide is configured to receive light and output collimated light towards the semi-reflective mirror 620. The semi-reflective mirror 620 allows all or substantially all of light to pass from the birdbath waveguide 610 towards the birdbath optically powered element 630. Birdbath optically powered element 630 imparts an angular offset onto the light such that it diverges and forms a virtual image plane 240. The light is reflected from birdbath optically powered element towards the semi-reflective mirror 620. Semi-reflective mirror 620 reflects the light from the birdbath optically powered element 630 towards the user. The arrangement of FIG. 6 allows for at least one of the birdbath waveguide 610 and birdbath optically powered element 630 to be opaque, or substantially opaque.

The semi-reflective mirror may appear transparent to visible light or substantially transparent to visible light from the viewing angle of the user.

The figures merely illustrate a single colour of light in the optical systems. However, this is for convenience and ease of understanding the drawings, and that any suitable number of colours may be appropriate depending upon the usage of the optical systems.

In some examples the optically powered element may be flat or substantially flat.

A holographic component or lens may be defined as an optical device that constructs new converging or diverging wavefronts defined by the optical power of the holographic component or lens through the principles of diffraction.

The invention claimed is:

1. An optical system to present an image to an eye of a user, the optical system comprising:
   a waveguide configured to output collimated light towards an optically powered element, the optically powered element comprising a holographic layer with a fixed optical power,
   the optically powered element is configured to receive the outputted collimated light from the waveguide and an optical power of the optically powered element is changed by the holographic layer changing a phase of the received collimated light and adjusting a curvature of the optically powered element, and the optically powered element directs the light having the changed phase towards the eye of the user with an angular offset from the received collimated light, the directed light forming a virtual image plane.

2. The optical system according to claim 1, wherein the optically powered element is configured to receive the outputted collimated light from the waveguide and direct the light having the changed phase towards the eye of the user through the waveguide.

3. The optical system according to claim 1, wherein the waveguide is configured to expand the collimated light in at least one dimension.

4. The optical system according to claim 1, wherein at least one component selected from components including a shape and the curvature of the optically powered element is configured to be at least one of being continuously variable and discretely variable.

5. The optical system according to claim 1, further comprising a combiner in an optical path between the waveguide and the eye of the user.

6. The optical system according to claim 1, wherein the optically powered element comprises a high reflectivity coating.

7. The optical system according to claim 1, wherein the optically powered element is tilted with respect to an optical axis of the waveguide.

8. The optical system according to claim 7, wherein the waveguide is configured to emit a portion of received light away from the eye of the user from an opposite side of the waveguide from which the collimated light is emitted towards the optically powered element, and light reflected from the tilted optically powered element is emitted towards the eye of a user through the waveguide.

9. The optical system according to claim 1, wherein the optically powered element is adjusted to be substantially flat.

10. The optical system according to claim 1, wherein the optically powered element has a convex curvature.

11. The optical system according to claim 10, wherein the convex curvature is in a direction toward the eye of the user.

12. The optical system according to claim 1, wherein the waveguide comprises an output element and the optically powered element overlaps at least a portion of the output element.

13. The optical system according to claim 12, wherein the optically powered element overlaps an entirety of the output element.

14. The optical system according to claim 13, wherein a length of the optically powered element is smaller than a length of the waveguide.

15. A look-through display comprising the optical system according to claim 1.

16. The look-through display according to claim 15, wherein the look-through display is selected from at least one of: a head mounted display, a head up display, and a head down display.

* * * * *